R. E. FOWLER.
Car Seat and Couch.

No. 21,412.

Patented Sept. 7, 1858.

UNITED STATES PATENT OFFICE.

R. E. FOWLER, OF CLAYTON, NEW YORK.

CAR SEAT AND COUCH.

Specification of Letters Patent No. 21,412, dated September 7, 1858.

*To all whom it may concern:*

Be it known that I, R. E. FOWLER, of Clayton, in the county of Jefferson and State of New York, have invented a new and useful Attachment to Car and other Seats; and I do hereby declare that the following is a full, clear, and exact description of the same, reference being had to the accompanying drawings, forming a part of this specification, in which—

Figure 1:
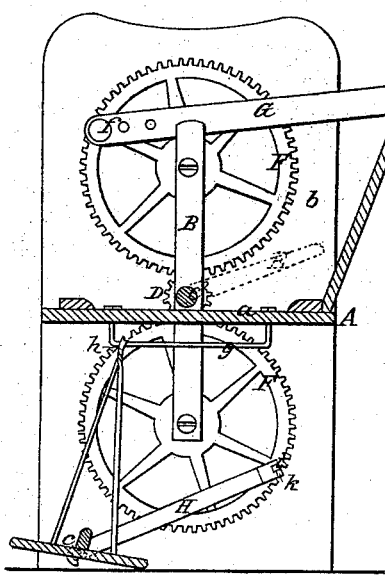
Figure 2:
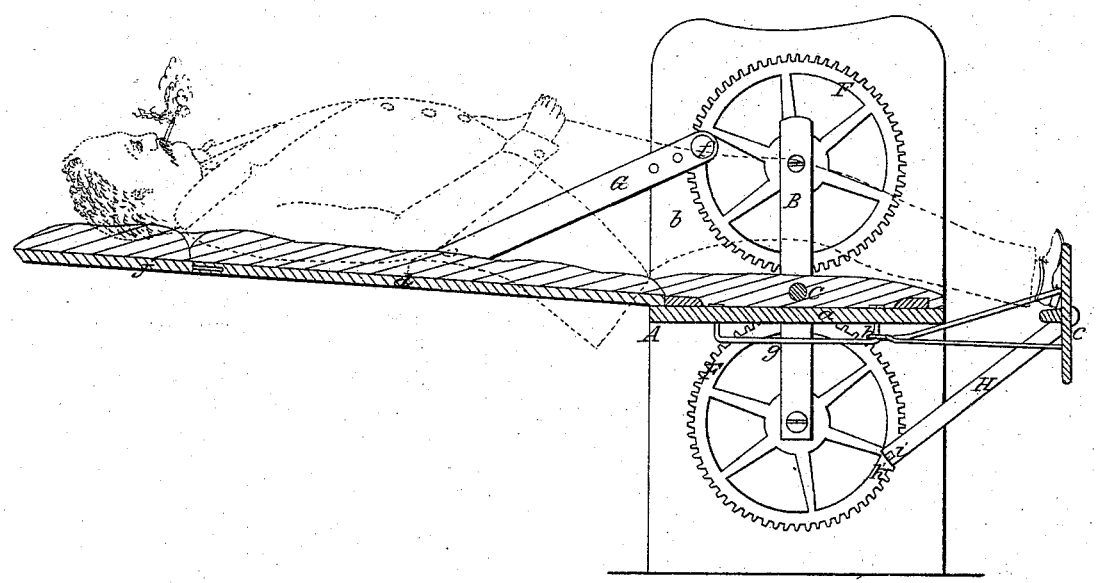

Figure 1, is a vertical central section of a car seat with my attachment applied to it. The seat being in position for serving as a day seat. Fig. 2, is a vertical section of the same, the seat being adjusted so as to serve as a resting or sleeping couch.

Similar letters of reference, in each of the several figures indicate corresponding parts.

In the application of reversible hinged adjustable backs and foot boards to car and other seats, my invention consists 1st in having a shaft extend from one end of the seat to the other, when said shaft is furnished at one end with a crank and at each end with a pinion or friction roller, and said pinions or friction rollers work in connection with large spur wheels or large friction rollers which have the arms of the backs or the arms of the foot boards pivoted eccentrically to them as hereinafter specified; whereby one of the occupants of the seat is enabled by turning the crank at one end of the shaft to adjust both arms, and consequently the back itself, and also the foot board, to any position desired or necessary to form a comfortable sleeping or reclining couch.

My invention consists 2nd, in attaching the arm of the foot board to the lower spur wheels or friction rollers by means of turning pivots and hinge joints, in combination with attaching the suspension rods of the foot boards by loose eyes to long staples or brackets; whereby the foot board can be shifted from the front to the back edge of the seat to correspond with the adjustment of the back, and whereby the arms of the foot board are rendered capable of moving in the path of vertical circles, and also capable of being turned around in the path of horizontal circles, as presently set forth.

To enable others skilled in the art, to make and use my invention, I will proceed to describe its construction and operation.

A, represents an ordinary car seat, its bottom *a*, and end boards *b, b*, are stationary, while its back *d*, and foot board *c*, are movable and adjustable by the following arrangement of mechanism.

B, B, are two upright plates fastened securely to the inner surface of the ends *b, b*, as shown. These plates extend below and above the bottom of the seat.

C, is a horizontal rod passing from end to end of the seat, and having its bearing in the plates B, B, and in the end boards *b, b*, as shown.

D, D, are cog pinions or friction rollers on the rod C, near its extremities, and E, is a crank on one of the extremities of the rod. By this crank the rod is turned so as to effect the adjustment of the seat.

F, F, are large spur wheels or friction rollers to work in gear with the small pinions or friction rollers D. These spur wheels are arranged one above the bottom of the seat and one below the bottom of the same, their axes being supported by the plates B, B, and the end boards of the seat.

G, G, H, H, are pivoted arms for connecting the back *d*, and foot board *c*, of the seat to the spur wheels F, F, said arms being attached to the wheels by pins *f, f*, which are set eccentric to the axes of the wheels as shown.

The back *d*, is not hinged to the seat except at the point where it is hinged or pivoted to the arms, whereas the foot board *c*, is hinged by means of long brackets *g, g*, and loose eyes *h, h*, to the bottom of the seat as well as at the points where it attaches to the arms H, H, as shown. By arranging the back and foot board as shown, and combining the two large spur wheels or friction rollers by a pinion or small friction roller, it will be evident that by turning the shaft or rod C, by means of the crank, the foot board and back will be adjusted together, the latter descending and the former rising as illustrated in Fig. 2, or vice-versa as illustrated in Fig. 1.

It should be noticed that the arms of the foot board are attached by a universal joint *i, k*, so that the foot board shall be allowed to descend in the path of a vertical circle and then, when necessary or when the foot board has been shifted from the position shown in Fig. 1, to the position shown in Fig. 2, the arms may be reversed or moved around in the path of a horizontal circle, and thus brought to a position for again hooking or attaching to the foot boards so as to support and combine it with the adjusting mechanism.

It is evident that in the application of my invention, the use of a foot board is not absolutely necessary for the same arrangement shown, independently of the lower large spur wheel, will answer for adjusting the backs of seats.

It is also evident that cog gearing is not absolutely necessary, for by using friction rollers, the center one covered with leather, or rubber, the adjustment can just as well be effected.

My mode of adjusting both sides of the back of car and other seats at the same time, is very simple and compact and not liable to derangement and what is most essential, is very convenient of management by even the most unskilful passengers at night time.

The arrangement affords pleasant day seats for sitting purposes and at night allows of comfortable sleeping couches being formed for all the passengers; an extension board $j$, being provided for lengthening the back when it is desired to use the seat as a couch.

What I claim as my invention and desire to secure by Letters Patent, is—

1. Having a shaft C, extend from one end of the seat to the other, when said shaft is furnished at one end with a crank E, and at each end with a pinion or friction roller D and said pinions or friction rollers work in connection with large spur wheels or large friction rollers F, F, which have the arms G, G, of the back $d$, or the arms H, H, of the foot board $c$ pivoted eccentrically to them, substantially as and for the purposes set forth.

2. Attaching the arms of the foot board $c$, to the lower spur wheels or friction rollers F, F, by means of turning pivots and hinge the joints $i$, $k$, in combination with attaching the suspension rods of the foot boards by loose eyes $h$ to long staples or brackets $g$, $g$; substantially as and for the purposes set forth.

R. E. FOWLER.

Witnesses:
   G. YORKE ATLEE,
   R. W. FENWICK.